C. Carr.
Iron Planer.
No. 85,904.
Patented Jan. 19, 1869.
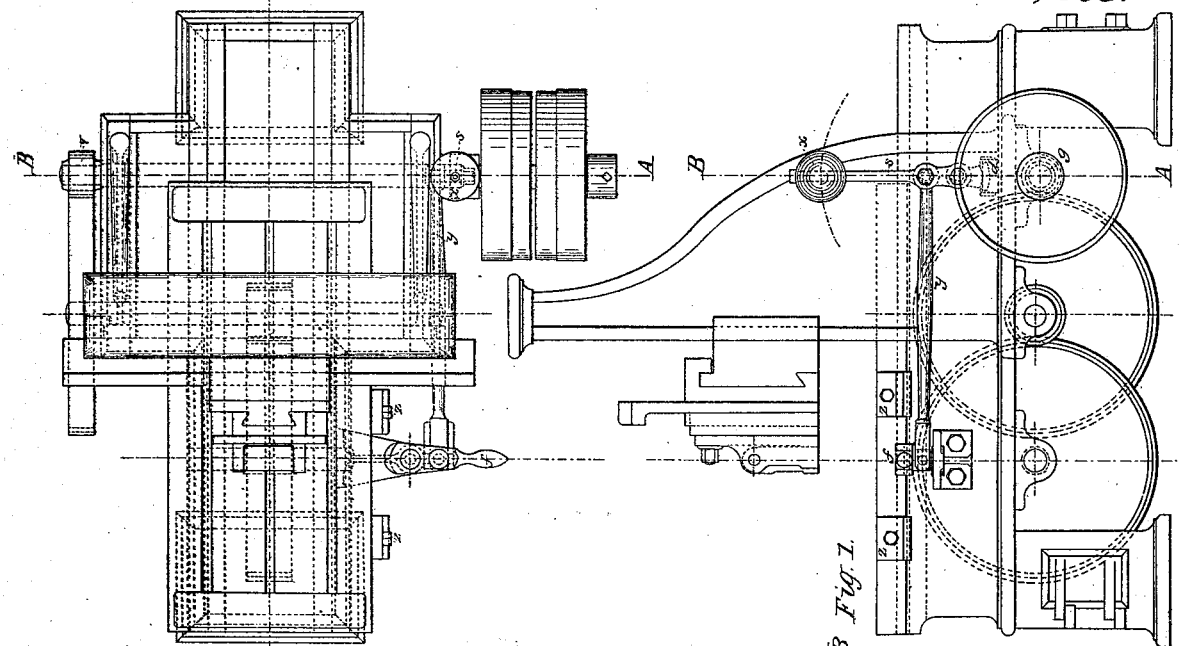
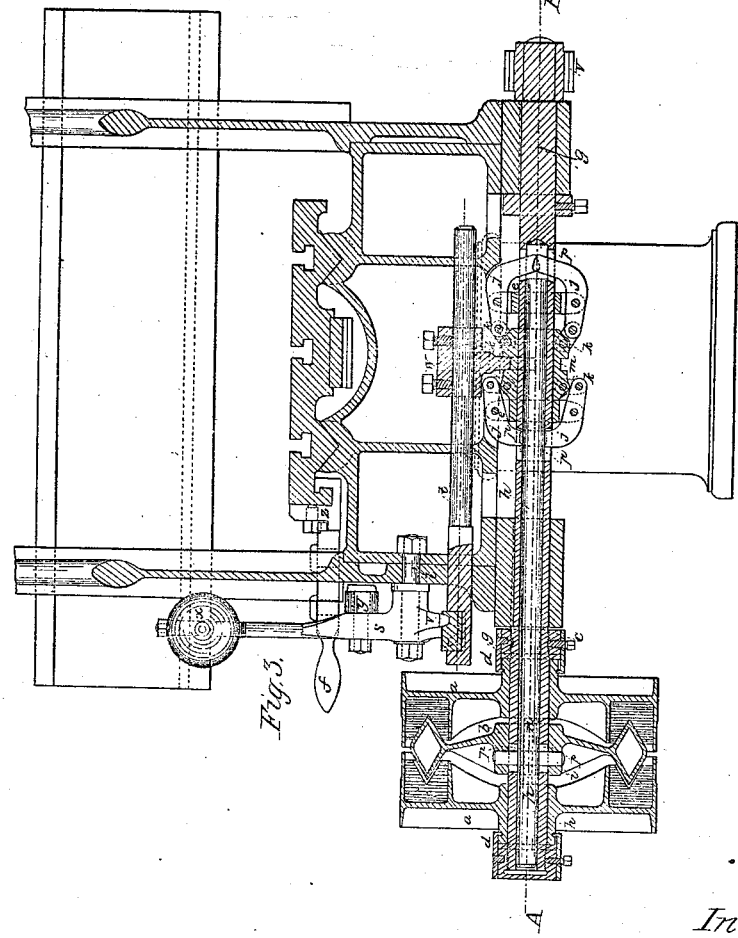
Fig. 2.
Fig. 1.
Fig. 3.
Witnesses:
Thomas Gaunt.
Arthur A. Burr
Inventor:
Charles Carr

CHARLES CARR, OF BOSTON, MASSACHUSETTS, ASSIGNOR TO BOSTON MACHINE COMPANY.

Letters Patent No. 85,904, dated January 19, 1869.

IMPROVEMENT IN IRON-PLANERS.

The Schedule referred to in these Letters Patent and making part of the same.

*To all whom it may concern:*

Be it known that I, CHARLES CARR, of Boston, in the county of Suffolk, and State of Massachusetts, have invented certain new and useful Improvements in Iron-Planers; and I do hereby declare the following to be a full, clear, and exact description of the construction and operation of the same, reference being had to the drawing, forming a part of this specification, of which—

Figure 1 is a side elevation.

Figure 2 is a plan, showing the reversing-dogs $z\ z$; also, representing the reversing-arm $f$ and lever $s$.

Figure 3 is a transverse section on line A B, representing the spiral groove $r$, by which the motion is communicated to the friction $b$.

$g$ is the hollow pulley-shaft, on which is keyed the driving-pinion $v$, and which carries the friction $b$, the same having a lateral motion on the spline $n$.

$a\ a$ are pulleys, running loose on the hollow shaft $g$, in reverse direction to each other.

$c\ c$ are nuts, screwed on the shaft $g$, to adjust the pulleys $a\ a$ to the friction $b$.

$d\ d$ are collars, which hold the pulleys back in their proper positions.

$i$ is a key, which secures the friction $b$ to the rod $h$.

$e\ e$ are clasps, lugs, or studs, secured to the shaft $g$, to carry, and also act as fulcra for fingers $j\ j\ j\ j$.

$m$ is a sliding collar, which is connected with the links $k\ k\ k\ k$, which give motion to the fingers $j\ j\ j\ j$.

$p\ p$ are slots, through the hollow shaft $g$ and rod $h$.

$s$ is a lever, hanging at $l$, the lower end being formed to fit the spiral groove or section of a screw, $r$, and the top carrying the ball $x$.

$y$ is a connnection between the lever $s$ and the reversing-arm $f$.

$t$ is a rod, through which the motion is conveyed from the lever $s$ to the sliding collar $m$ by the yoke $w$.

In operating, when the lever $s$ and arm $f$ are central, the planer is at rest. By moving either $f$ or $s$, the lever $s$ passes the centre, causing the spiral to rotate, which moves the rod laterally to the planer, carrying, with the yoke $w$, the sliding collar $m$.

The collar $m$, in sliding, throws the links $k\ k\ k\ k$ at one end in a vertical, and at the other end in an inclined position as toggle-joints. In doing so, the inner ends of the fingers $j\ j\ j\ j$ are moved in an opposite direction to collar $m$, and carrying with them the rod $h$, which forces the friction $b$ in contact with the pulleys $a\ a$.

The advantages gained by this invention:

First, the belts, one open and one crossed, continue to run on the same pulley, and are not moved from side to side, as in the usual way, thereby avoiding the continual "squeaking" caused by reversing, and also saving the "wear and tear" of the belts.

Second, the platen will always travel to the same point, (as in a crank-motion,) because the friction is relieved so suddenly, without having to reverse the belts.

Third, the accuracy with which it can be started or stopped.

Fourth, the ease with which the largest as well as the smallest can be started or stopped by the operator.

Claims.

1. I claim the combination of hollow shaft $g$, rod $h$, fingers $j\ j$, and studs $e\ e$, all constructed and arranged substantially as described, for the purpose of actuating the clutch $b$.

2. I also claim the combination of hollow shaft $g$, rod $h$, clutch $b$, and pulleys $a\ a$, all arranged and operating substantially as set forth.

3. I also claim the combination of lever $s$, spiral groove $r$, rod $t$, and yoke $w$, all arranged and operating to reciprocate the rod $h$, in the manner specified.

4. I also claim the combination of the subject-matter of the second and third clauses, arranged to operate in the manner and for the purpose substantially as set forth.

CHARLES CARR.

Witnesses:
ARTHUR A. BURR,
THOMAS GAUNT.